Aug. 3, 1965   R. B. ANNAT   3,198,547
TRACTOR WEIGHT TRANSFER CONTROL
Filed April 8, 1963   2 Sheets-Sheet 1

Inventor
Robert Buchanan Annat
By
Wolf, Hubbard, Voit & Osann
Attorney

Aug. 3, 1965  R. B. ANNAT  3,198,547
TRACTOR WEIGHT TRANSFER CONTROL
Filed April 8, 1963  2 Sheets-Sheet 2

Inventor
Robert Buchanan Annat
By
Attorney

United States Patent Office 3,198,547
Patented Aug. 3, 1965

3,198,547
TRACTOR WEIGHT TRANSFER CONTROL
Robert B. Annat, Kenilworth, England, assignor to Massey-Ferguson (United Kingdom) Limited, London, England, a British company
Filed Apr. 8, 1963, Ser. No. 271,346
Claims priority, application Great Britain, Apr. 11, 1962, 13,955/62
2 Claims. (Cl. 280—405)

This invention relates to tractors having hydraulic lift hitch linkages of the "Ferguson system" type and more particularly concerns a weight transfer control for such tractors.

Tractors of this type are provided with a hydraulic ram coupled through drop links to a pair of trailing draft links that connect the tractor to the implement or trailer being moved by the tractor. Conventionally, the load on the hitch linkage is sensed by a control spring, and changes in the position of the control spring are used to control the flow of fluid to and from the ram.

When an implement having ground engaging wheels is coupled to a tractor of this type, it has been proposed to utilize the ram for transferring a substantial portion of the implement weight to the rear drive wheels of the tractor. This is usually accomplished by causing the ram to exert a lifting force on the implement, with the result that the lifted weight is transferred to the tractor rear wheels so as to increase their tractive grip.

Weight transfer from a wide implement, i.e., one appreciably wider than the track of the rear tractor drive wheels, presents added difficulties. The connection through which the lifting force is exerted must permit relative sideways tilting movement between the tractor and the implement, and, if the weight transfer is to be held constant, the system must distinguish between such sideways tilting and movement up and down of the entire implement.

It is an object of the invention to provide a tractor of the above type with a control arrangement insuring uniform weight transfer from a wide implement while freely permitting sideways tilting of the implement so as to insure substantially constant implement working depth.

A further object is to provide a control arrangement of the above type which can be quickly and conveniently conditioned to eliminate free sideways tilting, when a more rigid coupling is desired, while maintaining controlled weight transfer.

Another object is to provide a control arrangement as characterized above that can be easily embodied in tractors of the general type referred to above.

Figure 1:
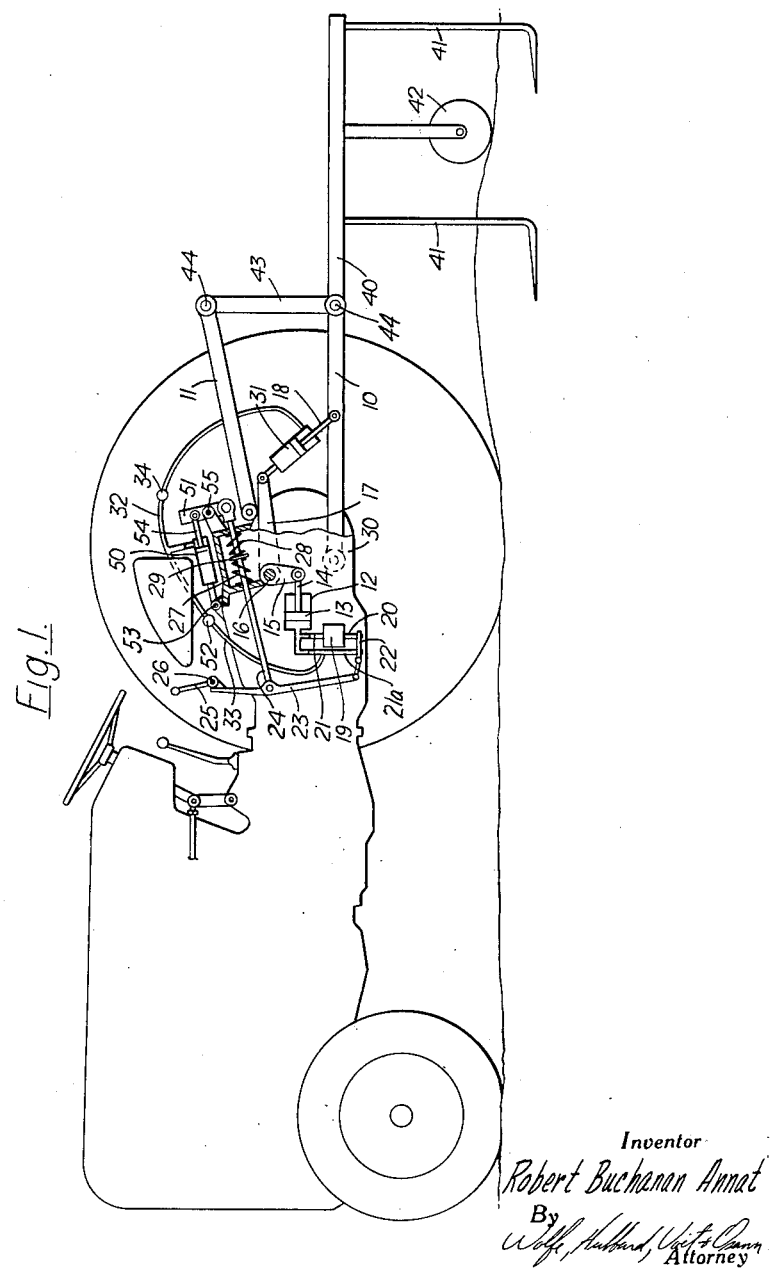
Figure 2:
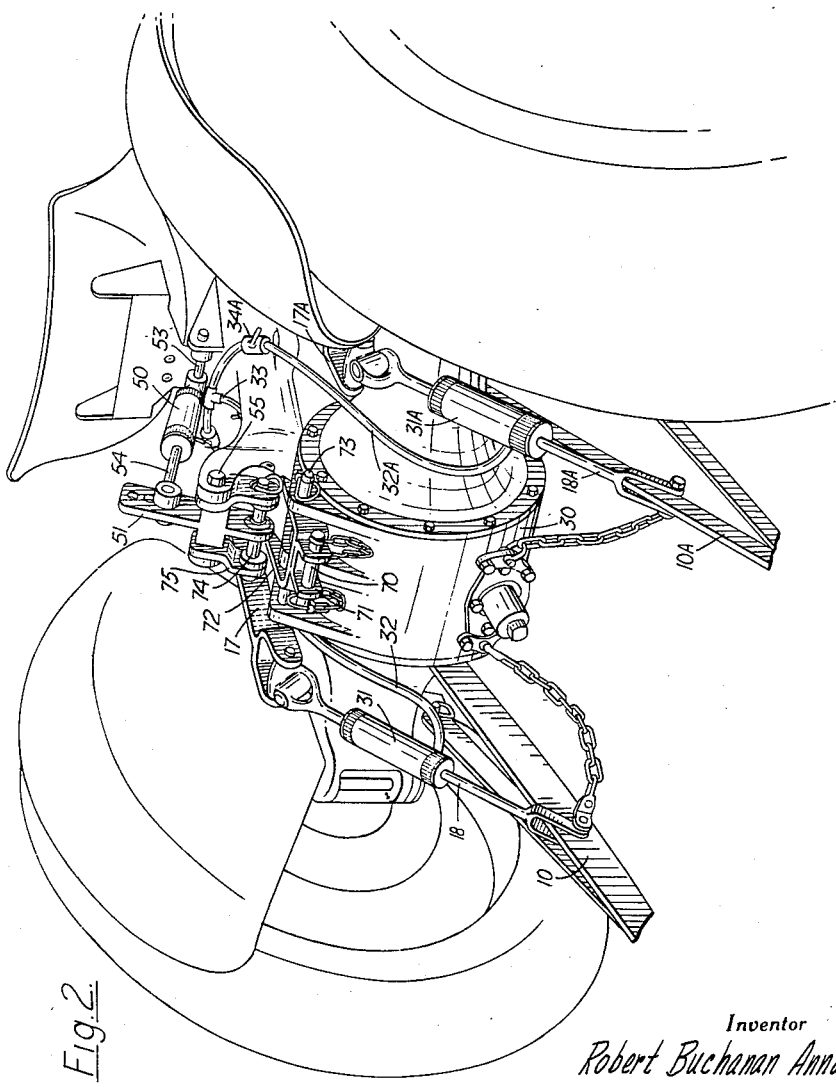

Other objects and advantages of the invention will become apparent upon reading the following detailed description and upon reference to the drawings, in which:

FIGURE 1 is a diagrammatic side elevation, partially in section, of a tractor embodying the invention coupled to a ground wheel supported implement; and FIG. 2 is a fragmentary rear quarter perspective of a portion of the control system which appears diagrammatically in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown a tractor having a hydraulic lift hitch linkage of the "Ferguson system" type. As is typical, the linkage includes a pair of lower trailing draft links 10 and 10a and a single upper link 11. A ram consisting of a cylinder 12 containing a piston 13 is mounted within the frame of the tractor and a piston rod 14 is connected to a depending arm 15 on a rotatable cross shaft 16. Lift arms 17 and 17a are secured to the cross shaft 16, and drop links 18 and 18a, respectively, extend from the lift arms to the lower draft links 10 and 10a, respectively.

The ram is supplied with fluid from a pump 19 having suction and delivery conduits 20 and 21, respectively, the latter of which is open to the ram cylinder 12. A control valve 22 controls the output of the pump 19 by opening and closing the suction conduit 20 and by exhausting fluid from the ram through a conduit 21a. The valve 22 is operated by a floating lever 23 that is connected to a control rod 24 and which has an upper fulcrum point defined by a cam 26 that may be adjustably positioned by a hand lever 25. A double acting spring device consisting of two mutually opposed compression springs 27 and 28 act upon an intermediate collar 29 secured to the control rod 24.

With two exceptions, the operation and construction of the parts so far described are quite familiar to those skilled in this art. The first exception lies in the fact that the upper link 11 is pivotally anchored to the tractor body 30. Conventionally, the upper link is connected to the control rod, and tension or compression in the upper link reacts against the forces of the springs 27, 28 so as to operate the control valve 22 and maintain a predetermined loading in the upper link. In the present embodiment, however, the upper link, like the lower links 10 and 10a, is anchored to the tractor body.

The second exception is that the drop links 18, 18a are not of fixed length as is conventional but rather include interposed hydraulic actuators 31 and 31a, respectively. The actuators 31, 31a are single acting and are interconnected by branch conduits 32 and 32a, respectively, which lead from a main conduit 33. The branch conduits are connected to the actuators so that fluid under pressure flowing from the main conduit 33 tends to shorten the drop links 18, 18a. Preferably, or/off valves 34 and 34a are interposed in the respective conduits 32, 32a.

Coupled to the tractor is a ground wheel supported implement in the form of a cultivator which includes a frame 40 carrying rows of soil working implements 41 and a pair of ground engaging wheels 42, of which only one is shown. The frame 40 includes an upstanding subframe 43 and the cultivator is secured to the lower links 10, 10a and the upper link 11 through the usual ball joints 44.

In carrying out the invention, a hydraulic actuator 50 is anchored to the tractor body 30 and mechanically connected through a lever 51 to the control rod 24. The actuator 50 includes a piston rod 54, and the rod end of the actuator is hydraulically connected to the conduit 33, and thus to the branch conduits 32, 32a. An on/off valve 52 is interposed in the conduit 33, which extends to the pressure side of the ram cylinder 12 and the pump 19.

The head end of the actuator 50 is pivotally connected at 53 to the tractor body and the piston rod 54 is pivotally connected to the upper end of the lever 51. The lever 51 is fulcrumed between its ends at 55 on the tractor body 30 and is pivotally secured at its lower end to the control rod 24.

To consider the operation of the apparatus, it will first be assumed that the valves 34 and 34a are closed so that the actuators 31, 31a become nonextensible and the drop links 18, 18a act as conventional drop links of definite fixed length. The valve 52 is opened and the hand lever 25 is set so that a small proportion of the total downward force exerted by the implement, that force being made up of the implement weight, soil reaction and downward suck, is supported by the ground wheels 42. The remainder of the implement's downward force is transferred to the rear wheels of the tractor by the ram 12 exerting a lifting force on the lift arms 17, 17a which, through the drop links 18, 18a, tends to lift the lower draft links 10, 10a. Therefore, any variation of the pressure between the implement wheel 42 and the soil will tend to vary inversely the hydraulic pressure in the ram cylinder 12, with the result that this pressure difference in the cylinder 12 acts as a signal that is transmitted to the actuator 50 and, through the lever 51, to the control rod 24 which causes the control valve 22 to make the appropriate adjustment which will return the ram pressure to its initial value. Viewed in another way, the hydraulic pressure in the ram 12 will, because of the actuator 50, remain constant and, hence, the amount of weight transferred from the implement to the tractor will also be maintained at a uniform value.

For example, assume that the wheels 42 of the implement encounter a rise in the ground. The increase in pressure on the wheels 42 will tend to force the draft links 10, 10a upwardly and the hydraulic pressure in the ram 12 will decrease. This simultaneously decreases the pressure in the actuator 50 and the control rod 24, under its spring bias, will shift the lever 23 so that the valve 22 is operated causing the ram to raise the draft links until the system reverts to its previous pressure. In this manner, the rising wheels 42 cause the working depth of the tools 41 to be maintained substantially constant. Conversely, should the wheels 42 encounter a hollow in the ground, a corresponding lowering signal will be sensed by the actuator 50 and transmitted to the valve 22.

In the above discussion, the possibility that the implement would tilt sideways has been ignored and, of course, closing the valves 34, 34a, which fixes the length of the drop links 18, 18a, prohibits sideways tilting movement of the implement relative to the tractor. Thus, the mode of operation discussed above is suitable for implements whose widths do not appreciably exceed the track of the tractor. However, the present invention permits controlled weight transfer from wide implements without interfering with the sideways tilting of the implement relative to the tractor.

In operation with a wide implement, the valves 34 and 34a are opened and the valve 52 is closed so that fluid is free to flow to and fro between the actuators 31, 31a. Thus, the drop links 18, 18a become freely extensible and contractible as the implement tilts sideways relative to the tractor in its progress over undulating ground. Under these conditons, should the implement simply tilt, with one side rising an amount exactly equal to the lowering of the opposite side, there would be a flow of liquid from one of the actuators 31, 31a to the other with no change in the hydraulic pressure exerted in the actuator 50. However, if both sides of the implement were elevated by undulating ground in equal amount, there would be an equal flow of fluid from the actuators 31, 31a to the actuator 50 and this additional fluid would, through the lever 51, shift the control rod 24 so as to cause the draft links 10, 10a to be lifted until the pressure in the actuator 50 reverts to its previous value. Conversely, if both sides of the implement drop an equal amount, liquid would be withdrawn from the actuator 50 by the actuators 31, 31a and this would serve as a signal to the actuator 50 resulting in lowering of the draft links.

Of course, in actual practice, pure tilting of a wide implement, or pure raising or lowering of the implement, would rarely occur. Ordinarily, undulating ground would cause the implement to both tilt sideways and raise or lower. There would therefore be a normal recurring cross flow of liquid between the actuators 31, 31a and also a flow of liquid to and from the actuator 50. This latter flow, of course, is a measure of the actual rise or fall of the implement and it is this flow which is the signal that causes the power lift system to be operated to raise or lower the draft links 10, 10a. There is thus maintained an approximately constant transfer of weight from the implement even though the implement is also permitted to tilt sideways relative to the tractor.

FIG. 2 illustrates more completely the adaptation of the present invention to a standard type of tractor. In this construction, a pin 70 passing through the jaws of a bracket 71 is provided for securing the upper hitch link 11 to the tractor. The bracket 71 is integrally secured to a second bracket 72 that is anchored on the tractor body 30 by a conventional long pin 73.

In a tractor of the type illustrated, the upper hitch link 11 is normally secured to a cross pin 74 held by a suspensory link 75 that is pivoted on the pin 55 which is utilized as the fulcrum for the lever 51. The rear fork of the control rod 24 is, as is normal, connected to the pin 74 and this pin also passes through the bottom end of the lever 51 so as to define a pivotal lower connection therewith.

The actuator 50 is pivotally anchored at 53 to the top of the tractor body and the conduit 33 extends to the front or head end of the actuator and communicates with the rear or rod end through an internal pipe, not shown. The rod 54 of the actuator 50 is pivotally connected to one of a plurality of holes provided in the upper end of the lever 51.

I claim as my invention:

1. In a tractor having a pair of trailing draft links and a hydraulic system including a ram controlled by a spring positioned control rod, the improvement comprising, in combination, first and second hydraulic actuators respectively coupling said pair of draft links to said ram so that pressure in the ram lifts the links through the fluid in the actuators, a line hydraulically coupling said first and second actuators so that one draft link can raise and the other fall without varying the pressure in said line, a third hydraulic actuator anchored on said tractor, means mechanically coupling said third actuator to said control rod so that the spring forces on the rod react against the fluid in the third actuator, and means hydraulically coupling said third actuator with said line so that the lifting forces in said first and second actuators are sensed by said control rod without regard to the relative vertical positions of said links.

2. In a tractor having a pair of trailing draft links and a hydraulic system including a ram controlled by a spring positioned control rod, the improvement comprising, in combination, first and second hydraulic actuators respectively coupling said pair of draft links to said ram so that pressure in the ram lifts the links through the fluid in the actuators, a line hydraulically coupling said first and second actuators so that one draft link can raise and the other fall without varying the pressure in said line, a third hydraulic actuator anchored on said tractor, means mechanically coupling said third actuator to said control rod so that the spring forces on the rod react against the fluid in the third actuator, valves in said line for selectively blocking fluid flow between said first and second actuators so as to prevent relative vertical movement of the draft links, and means for hydraulically coupling said ram to said third actuator so that the lifting force in the ram is sensed by the control rod.

References Cited by the Examiner

UNITED STATES PATENTS

| 2,627,796 | 2/53 | Bunting | 172—2 |
| 3,062,561 | 11/62 | Wulff et al. | 280—405 |
| 3,073,622 | 1/63 | Merritt | 280—405 |

A. HARRY LEVY, *Primary Examiner.*